(12) United States Patent
Wang

(10) Patent No.: US 10,636,083 B1
(45) Date of Patent: Apr. 28, 2020

(54) SYSTEMS METHODS AND ARTICLES OF MANUFACTURE FOR ANALYZING ON-LINE BANKING ACCOUNT DATA USING HYBRID EDIT DISTANCE

(75) Inventor: Gang Wang, San Diego, CA (US)

(73) Assignee: INTUIT INC., Mountain View, CA (US)

(*) Notice: Subject to any disclaimer, the term of this patent is extended or adjusted under 35 U.S.C. 154(b) by 197 days.

(21) Appl. No.: 13/192,363

(22) Filed: Jul. 27, 2011

(51) Int. Cl.
*G06Q 40/00* (2012.01)
(52) U.S. Cl.
CPC .................. *G06Q 40/00* (2013.01)
(58) Field of Classification Search
CPC ........................................... G06Q 40/00
USPC ....................................... 705/35–39
See application file for complete search history.

(56) References Cited

U.S. PATENT DOCUMENTS

| | | | |
|---|---|---|---|
| 8,122,022 B1* | 2/2012 | Baker | 707/736 |
| 8,266,168 B2* | 9/2012 | Bayliss | 707/758 |
| 2010/0106724 A1* | 4/2010 | Anderson | G06N 20/00 707/737 |
| 2011/0246268 A1* | 10/2011 | Satyavolu | G06Q 30/02 705/14.4 |
| 2011/0258091 A1* | 10/2011 | Wilson et al. | 705/30 |
| 2012/0269354 A1* | 10/2012 | Doherty et al. | 381/56 |

OTHER PUBLICATIONS

Publication info: Targeted News Service [Washington, D.C] Jul. 13, 2010. ASU Professors Create Innovative Software Program to Translate Text Messages (Year: 2010).*

* cited by examiner

*Primary Examiner* — Bruce I Ebersman
*Assistant Examiner* — John A Anderson
(74) *Attorney, Agent, or Firm* — DLA Piper LLP (US)

(57) ABSTRACT

Computer-implemented methods, articles of manufacture and systems for identifying and/or classifying an on-line banking account utilized for business purposes. A computer processor receives or determines a description of an on-line banking account including an abbreviation. Rules are executed determine respective edit distances or scores representing respective degrees of transformation from the abbreviation to respective normalized strings or words. At least one rule specifies that an edit distance or score for transforming an abbreviation to a normalized string is determined without considering any vowel appearing after a first letter of the normalized string if a first letter of the abbreviation is the same as a first letter of the normalized string. Respective edit distances or scores are determined, and at least one string is selected as corresponding to the abbreviation, e.g., the string being associated with the lowest edit distance or score as determined from application of the rules.

15 Claims, 17 Drawing Sheets

```
┌──────────────────────────────────────────────────────────────┐  102
│ RECEIVE AS INPUT TO RULE PROCESSOR AN ABBREVIATION WITHIN    │
│   NAME OR DESCRIPTION OF ACCOUNT HOSTED BY FINANCIAL         │
│                       INSTITUTION                            │
└──────────────────────────────────────────────────────────────┘
                              ↓
┌──────────────────────────────────────────────────────────────┐  104
│ APPLY RULES TO DETERMINE RESPECTIVE EDIT SCORES REPRESENTING │
│  RESPECTIVE DEGREES OF TRANSFORMATION FROM THE ABBREVIATION  │
│                 TO PRE-DETERMINED STRINGS                    │
└──────────────────────────────────────────────────────────────┘
                              ↓
┌──────────────────────────────────────────────────────────────┐  106
│   DETERMINE WHETHER ACCOUNT IS ACCOUNT OF BUSINESS OR USED   │
│  TO BUSINESS PURPOSES AND/OR CLASSIFY BUSINESS ACCOUNT USING │
│   STRING SELECTED BASED AT LEAST IN PART UPON RESPECTIVE     │
│                        EDIT SCORES                           │
└──────────────────────────────────────────────────────────────┘
```

1. assn → fassn (insertion of 'f' before 'a')
2. fassn → fissn (insertion of 'i' after 'f' and before 's')
3. fissn → finsn (replacement of 's' with 'n')
4. finsn → finasn (insertion of 'a' after 'n' and before 's')
5. finasn → finan (deletion of "s")
6. finan → financ (insertion of 'c' after 'n')
7. financ → financi (insertion of 'i' after 'c')
8. financi → financia (insertion of 'a' after 'i')
9. financia → financial (insertion of 'l' after 'a')

Levenshtein Distance for "assn" → "financial" = 9

FIG. 8B

1. assn → tssn (replacement of 'a' with 't')
2. tssn → thsn (replacement of 's' with 'h')
3. thsn → then (replacement of 's' with 'e')
4. then → ther (replacement of 'n' with 'r')
5. ther → thera (insertion of 'a' after 'r')
6. thera → therap (insertion of 'p' after 'a')
7. therap → therapy (insertion of 'y' after 'p')

Levenshtein Distance for "assn" → "therapy" = 7

FIG. 8C

1. assn → ass<u>o</u>n (insertion of 'o' after 's' and before 'n')
2. asson → asso<u>c</u>n (insertion of 'c' after 'o' and before 'n')
3. assocn → associ<u>i</u>n (insertion of 'i' after 'c' and before 'n')
4. associn → associ<u>a</u>n (insertion of 'a' after 'i' and before 'n')
5. associan → associa<u>t</u>n (insertion of 't' after 'a' and before 'n')
6. associatn → associat<u>i</u>n (insertion of 'i' after 'a' and before 'n')
7. associatin → associati<u>o</u>n (insertion of 'o' after 'i' and before 'n')

Levenshtein Distance for "assn" → "association" = 7 — 810d

815  ⟵⟶  217 assn → ass<u>oiaio</u>n (first letter matches so according to Wang Distance, the Levensthtein distance is not applicable to vowels 'o', 'i', 'a', 'i' and 'o' following matching "a")

1. assoiaion → asso<u>c</u>iaion (insertion of 'c' after 'o' and before 'i')
2. associaion → associa<u>t</u>ion (insertion of 't' after 'a' and before 'i')

Hybrid / Wang Distance for "assn" → "association" = 2 — 820

224 ⟶  424a ⟶

FIG. 8E 1. svc → cvc (replace 's' with 'c')
2. cvc → clc (replace 'v' with 'l')
3. clc → clic (insertion of 'i' after 'l' and before 'c')
4. clic → clinc (insertion of 'n' after 'i' and before 'c')
5. clinc → clinic (insertion of 'i' after 'n' and before 'c')

Levenshtein Distance for "svc" → "clinic" = 5    910b 224    424a

FIG. 9B

1. svc → ovc (replace 's' with 'o')
2. ovc → ofc (replace 'v' with 'f')
3. ofc → offc (insertion of 'f' after 'f' and before 'c')
4. offc → offic (insertion of 'i' after 'f' and before 'c')
5. offic → office (insertion of 'e' after 'c')

Levenshtein Distance for "svc" → "office" = 5    910c 224    424b

FIG. 9C

1. svc → sc (deletion of 'v')
2. sc → sc<u>h</u> (insertion of 'h' after 'c')
3. sch → sch<u>o</u> (insertion of 'o' after 'h')
4. scho → scho<u>o</u> (insertion of 'o' after 'o')
5. schoo → schoo<u>l</u> (insertion of 'l' after 'o')

Levenshtein Distance for "svc" → "school" = 5    910d
224    424c

FIG. 9D

1. svc → s<u>e</u>vc (insertion of 'e' after 's')
2. sevc → se<u>r</u>vc (insertion of 'r' after 'e')
3. servc → serv<u>i</u>c (insertion of 'i' after 'v')
4. servic → servic<u>e</u> (insertion of 'e' after 'c')

Levenshtein Distance for "svc" → "service" = 4    910e
224    424d

FIG. 9E

815    217 svc → service (first letter matches so according to Wang Distance, the Levensthtein distance is not applicable to vowels 'e', 'i', 'e' following matching 's')

1. seie → se<u>r</u>ie (insertion of 'r' after 'e' and before 'i')
2. serie → ser<u>v</u>ie (insertion of 'v' after 'r' and before 'i')
3. servie → servi<u>c</u>e (insertion of 'c' after 'i' and before 'e')

Hybrid / Wang Distance for "svc" → "service" = 3    920
224    424d

FIG. 9F

1. rest→re<u>n</u>t (replace 's' with 'n')
2. rent→<u>m</u>ent (replace 'r' with 'm')
3. ment→<u>t</u>ment (insertion of 't' before 'm')
4. tment→<u>r</u>tment (insertion of 'r' before 't')
5. rtment→<u>a</u>rtment (insertion of 'a' before 'r')
6. artment→<u>p</u>artment (insertion of 'p' before 'a')
7. partment→<u>a</u>partment (insertion of 'a' before 'p')

Known Levenshtein Distance for "rest" → "apartment" = <u>7</u> ⟶ 1010b

224 ⟶      424a

FIG. 10B 1. rest→<u>d</u>est (replace 'r' with 'd')
2. dest→des<u>i</u> (replace 't' with 'i')
3. desi→desi<u>g</u> (insertion of 'g' after 'i')
4. desig→desig<u>n</u> (insertion of 'n' after 'g')

Levenshtein Distance for "rest" → "design" = <u>4</u> ⟶ 1010c

224 ⟶      424b

FIG. 10C 1. rest→rest<u>a</u> (insertion of 'a' after 't')
2. resta→resta<u>u</u> (insertion of 'u' with 'a')
3. restau→restau<u>r</u> (insertion of 'r' after 'u')
4. restaur→restaur<u>a</u> (insertion of 'a' after 'r')
5. restaura→restaura<u>n</u> (insertion of 'n' after 'a')
6. restauran→restauran<u>t</u> (insertion of 't' after 'n')

Levenshtein Distance for "rest"→"restaurant" = 6  ~1010d
224   424c

FIG. 10D

815    217 rest→restaurant (first letter matches so according to Wang Distance, the Levensthtein distance is not applicable to vowels 'a', 'u', 'a' following matching 'r')

1. restaua→restau<u>r</u>a (insertion of 'r' after 'u' and before 'a')
2. restaura→restaura<u>n</u> (insertion of 'n' after 'a')
3. restauran→restauran<u>t</u> (insertion of 't' after 'n')

Hybrid / Wang Distance for "rest"→"restaurant" = 3  ~1020
224   424c

FIG. 10E

SYSTEMS METHODS AND ARTICLES OF MANUFACTURE FOR ANALYZING ON-LINE BANKING ACCOUNT DATA USING HYBRID EDIT DISTANCE

BACKGROUND

Embodiments relate to analysis of electronic data such as data of an on-line banking account hosted by a financial institution. On-line banking is very popular, and millions of users manage their accounts utilizing on-line banking There are many times when an account is opened by a user, but then utilized for business or personal and business purposes. Users, however, may not identify themselves as a business or indicate that the account is utilized for business purposes. Further, if users do identify accounts for a business or used for business purposes, it may be difficult to classify or determine the type of business or business activity from the information provided since account names, while familiar to users, may be incomplete or include a short and often ill-formed text descriptions such as abbreviations that make it difficult to discern the meaning or context of an account name, and even more difficult to determine whether an account so named is used for business purposes and which types of business activities.

Thus, financial institutions often treat users who conduct only personal transactions and users who conduct business or business and personal transactions indifferently. It is estimated that the number of such users is on the order of millions. Many users of on-line banking services do not receive the benefit of additional business-related account services, software programs or offerings, and support or promotions related to their business activities. Likewise, financial institutions miss out on opportunities to better serve and satisfy customer needs, enhance customer experiences and loyalty to the financial institution, and the opportunity to cross-sell the customer to other products or services useful to their business activities.

SUMMARY

One embodiment is directed to a computer-implemented method for determining a normalized form of an abbreviation or shorthand expression within a name or description of an on-line banking account or, in other words, determining a full or complete word corresponding to an abbreviation or short version of that word. The method comprises receiving or determining the description of the on-line banking account including one or more abbreviations. The method further comprises applying a set of rules to pairs of the abbreviation and a plurality of pre-determined normalized strings. The rules are used to determine respective edit distances that represent respective degrees of transformation required to transform the abbreviation to respective normalized strings. At least one rule of the rule set specifies that an edit distance for an abbreviation—normalized string pair is determined without considering any vowel appearing after a first letter of the normalized string if a first letter of the abbreviation is the same as the first letter of the normalized string. In other words, such vowels following a matching first letter do not contribute to the edit distance. A normalized string is selected from the plurality of pre-determined normalized strings based at least in part upon the respective edit distances.

A further embodiment is directed to a computer-implemented method for determining a normalized form of an abbreviation within a description of an on-line banking account and comprises receiving or determining the description of the on-line banking account that includes the abbreviation. The method further comprises applying a set of rules to pairs of the abbreviation and a plurality of pre-determined normalized strings to determine respective edit distances representing respective degrees of transformation to transform the abbreviation to respective normalized strings. The set of rules is applied to each abbreviation—normalized string pair to determine respective edits distances for the respective pairs. The set of rules comprises a first rule that specifies that an edit distance is determined without considering any vowel appearing after a first letter of the normalized string if a first letter of the abbreviation is the same as a first letter of the normalized string. In other words, such vowels do not contribute to the edit distance when first letters of a pair match. The rules also include a second rule specifying that if the first letter of the abbreviation is the same as the first letter of the normalized string, then the edit distance is determined by the computer applying a known edit distance such as the Levenshtein distance to all consonants following the matching first letter, and a third rule specifying that if the first letter of the abbreviation is not the same as the first letter of the normalized string, then the edit distance is determined by the computer applying a Levenshtein distance to all letters of the normalized string including vowels. A normalized string is then selected from the plurality of pre-determined normalized strings based at least in part upon the determined respective edit distances.

A further embodiment is directed to a computer-implemented method for determining a normalized form of an abbreviation and comprises receiving or determining the abbreviation and applying a set of rules to pairs of the abbreviation and a plurality of pre-determined normalized strings to determine respective edit distances representing respective degrees of transformation from the abbreviation to respective normalized strings. The set of rules includes a first rule that specifies that an edit distance for an abbreviation—normalized string pair is determined without considering any vowel appearing after a first letter of the normalized string if a first letter of the abbreviation is the same as the first letter of the normalized string. The method further comprises selecting a normalized string from the plurality of pre-determined normalized strings based at least in part upon the determined respective edit distances.

Further embodiments are directed to hybrid edit distance system that is a combination of an edit distance determination referred to as the Wang distance (named after the applicant of the subject application) and a known edit distance determination such as the Levenshtein distance. Wang distance determinations are performed when the first letter of an abbreviation—normalized string pair match, and Levenshtein analysis is applied to consonants following the first letter, but not vowels.

Yet further embodiments are directed to computer program products comprising a non-transitory computer readable storage medium embodying one or more instructions executable by a computer to perform processes for determining a normalized form of an abbreviation, e.g., an abbreviation within a description of an on-line banking account or an abbreviation within another data source or data feed such as a web feed.

Additional embodiments are directed to systems configured or operable to determine a normalized form of an abbreviation, e.g., an abbreviation within a description of an on-line banking account or an abbreviation within another data source or data feed such as a web feed. System embodiments may include a computer configured to implement such embodiments, a computer in combination with a data store or database with pre-determined normalized strings, e.g., a domain-specific reference dictionary. System embodiments may also include or involve an abbreviation filter such that abbreviations are processed according to embodiments, while non-abbreviated or full length words that appear in another dictionary can be separately processed, e.g., as described in U.S. application Ser. No. 13/192,453, filed on the same date herewith, issued as U.S. Pat. No. 8,341,081 on Dec. 25, 2012, and entitled "Intelligent Identification of On-line banking Accounts Utilized For Business Purposes" the contents of which are incorporated herein by reference.

In a single or multiple embodiments, the on-line banking account from which the description including the abbreviation is received is hosted by a financial institution. The computer configured or operable to implement embodiments may be a computer of the financial institution that hosts the on-line banking account or another host computer configured or operable to implement embodiments and receive such data from a financial institution computer. A host computer may perform such processing for one or multiple financial institutions.

In a single or multiple embodiments, the plurality of pre-determined normalized strings forming a specialized or domain-specific reference dictionary that is a subset of terms of a general dictionary. For example, a domain-specific reference dictionary may be generated business names so that abbreviations from various account descriptions can be processed according to embodiments to determine whether they correspond to business names or strings within a business-specific reference dictionary.

In a single or multiple embodiments, the rule set includes rules specifying actions if first letter of the abbreviation is the same as the first letter of the normalized string, and if the first letter of the abbreviation is not the same as the first letter of the normalized string. In the event of the former, the edit distance for transforming an abbreviation to a particular normalized string pair is determined without considering any vowel appearing after a first letter of the normalized string, and by the computer applying the Levenshtein or other known distance to all consonants following the first letter. However, in the event of the latter, the edit distance is determined by applying the Levenshtein or other known distance to all letters of the normalized string. In other words, embodiments are keyed to the first letter of the abbreviation and the normalized string to which it is compared. If there is no match, a Levenshtein or other known distance is used, but if they do match, an edit distance is determined without considering any subsequent vowels, while still utilizing the Levenshtein or other known distance for consonants.

After edit distances have been determined to indicate degrees of transformation from an abbreviation to various normalized strings, the computer selects at least one of the normalized strings as a best match or as having the highest probability of corresponding to the abbreviation. According to one embodiment, for this purpose, the computer selects a normalized string associated with the lowest edit score.

In a single or multiple embodiments edit distances can be determined for various abbreviation—normalized string pairs and in various applications in which the abbreviation is received from different sources. For example, an abbreviation may be from an electronic mail message or a web feed such as a webpage, a social networking site, or a Really Simple Syndication feed, and embodiments are utilized to discover or classify the web feed or source thereof.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIGS. 8A-E illustrate one example of how a hybrid edit distance metric according to embodiments may be utilized to identify a normalized string corresponding to an abbreviation and do so by generating edit distances that more clearly identify the normalized string and with more pronounced differences compared to edit distances involving normalized strings that do not correspond to the abbreviation;

FIGS. 9A-9F illustrate a further example of how a hybrid edit distance metric according to embodiments may be utilized to identify a normalized string corresponding to an abbreviation and do so by generating edit distances that more clearly identify the normalized string and with more pronounced differences compared to edit distances involving normalized strings that do not correspond to the abbreviation;

FIGS. 10A-E illustrate another example of how a hybrid edit distance metric according to embodiments may be utilized to identify a normalized string corresponding to an abbreviation and do so by generating edit distances that more clearly identify the normalized string and with more pronounced differences compared to edit distances involving normalized strings that do not correspond to the abbreviation.

DETAILED DESCRIPTION OF ILLUSTRATED EMBODIMENTS

Certain embodiments relate to analyzing a data feed such as descriptions or names of on-line banking accounts and/or account transaction histories including at least one abbreviation that was entered by an account holder. Embodiments utilize a rule engine that provides for rule-based analysis of abbreviations to automatically identify an on-line banking account that is a business account or utilized for business purposes and to determine further information or classify a business account based on information derived from the abbreviation.

For this purpose, the rule engine utilizes metrics or scores for determining a degree of transformation from the abbreviation or abbreviated string to a normalized full text word or string. These metrics are determined for various words within a domain-specific or customized database such that a metric or score is determined to show a degree of transformation from an abbreviation to a first word, from an abbreviation to a second word, and so on for the various words within the domain-specific database. Having the various metrics for these comparisons, the rule engine can select the best match, e.g., the word with the lowest degree of transformation, that best corresponds to the abbreviation or eliminates or reduces ambiguities regarding which string the abbreviation is intended to identify. In other words, the metrics provide a measure of the likelihood of the abbreviation being derived from or corresponding to the normalized string. This process may occur for one or multiple abbreviations within the account data, each of which is compared to a set of normalized strings, in order to derive a better understanding of the semantic meanings of the abbreviations, and how a user is utilizing an on-line banking account including those abbreviations. Having this knowledge, financial institutions can then present account cross-selling offers, opportunities or services that may be relevant to personal and/or business activities.

Figure 1:
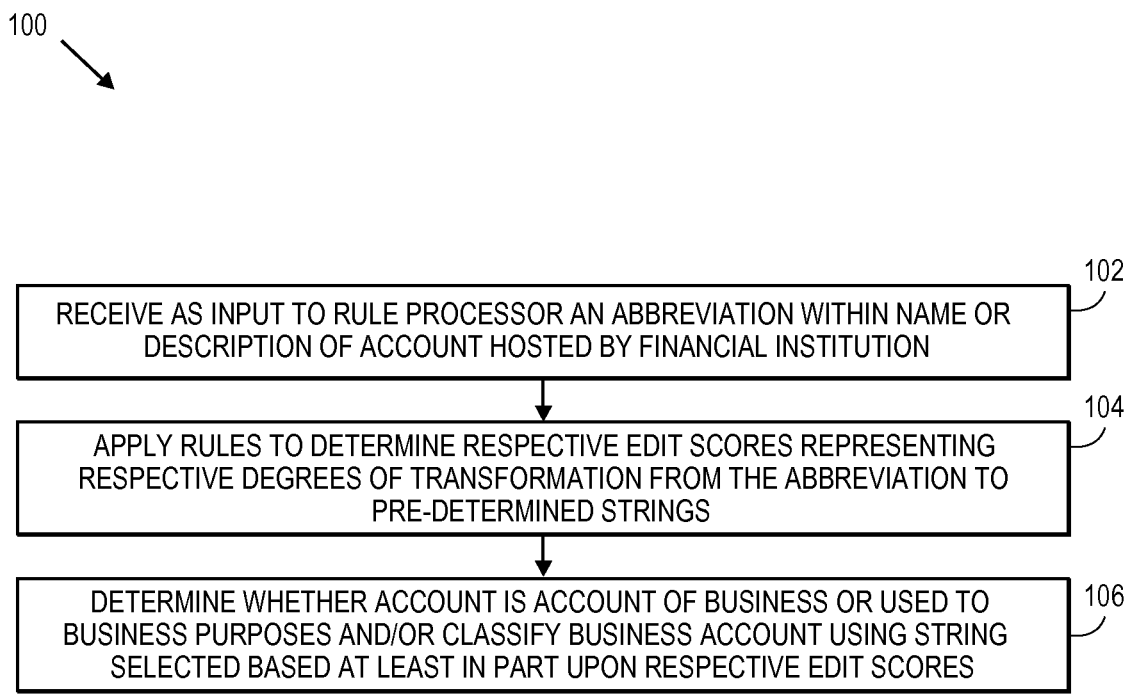
FIG. 1 is a flow diagram of one embodiment of a method for discovering, identifying or classifying on-line banking accounts that are business accounts or utilized for business or both personal and business purposes.

For example, referring to FIG. 1, a method 100 for determining whether an account is utilized for business purposes or for determination of additional information about or classifying the account comprises, at 102, receiving, at a rule engine or processor, an input in the form of data of an account including at least an abbreviation or abbreviated string (generally, "abbreviation") and that is hosted by a financial institution. At step 104, the rule processor applies rules to determine respective edit distances or edit scores representing respective degrees of transformation from the abbreviation to a pre-determined set of normalized strings, and at step 106, the rule processor determines whether the account from which the data was received is an account of a business or used for business purposes and/or classifies the account using a string selected based at least in part upon respective edit scores.

In this manner, accounts that are determined to be accounts of businesses, business owners or utilized for business purposes can be identified and/or classified by the financial institution hosting the account or by a third party who informs the financial institution of the rule processor results, thus presenting business opportunities for cross-selling or more targeted offerings of other products or services related to a customer's business or account activity and providing more incentives to identified customers to remain at their current financial institution rather than opening another account at a different financial institution. Embodiments and aspects thereof are in further detail with reference to FIGS. 2-11.

Figure 2:
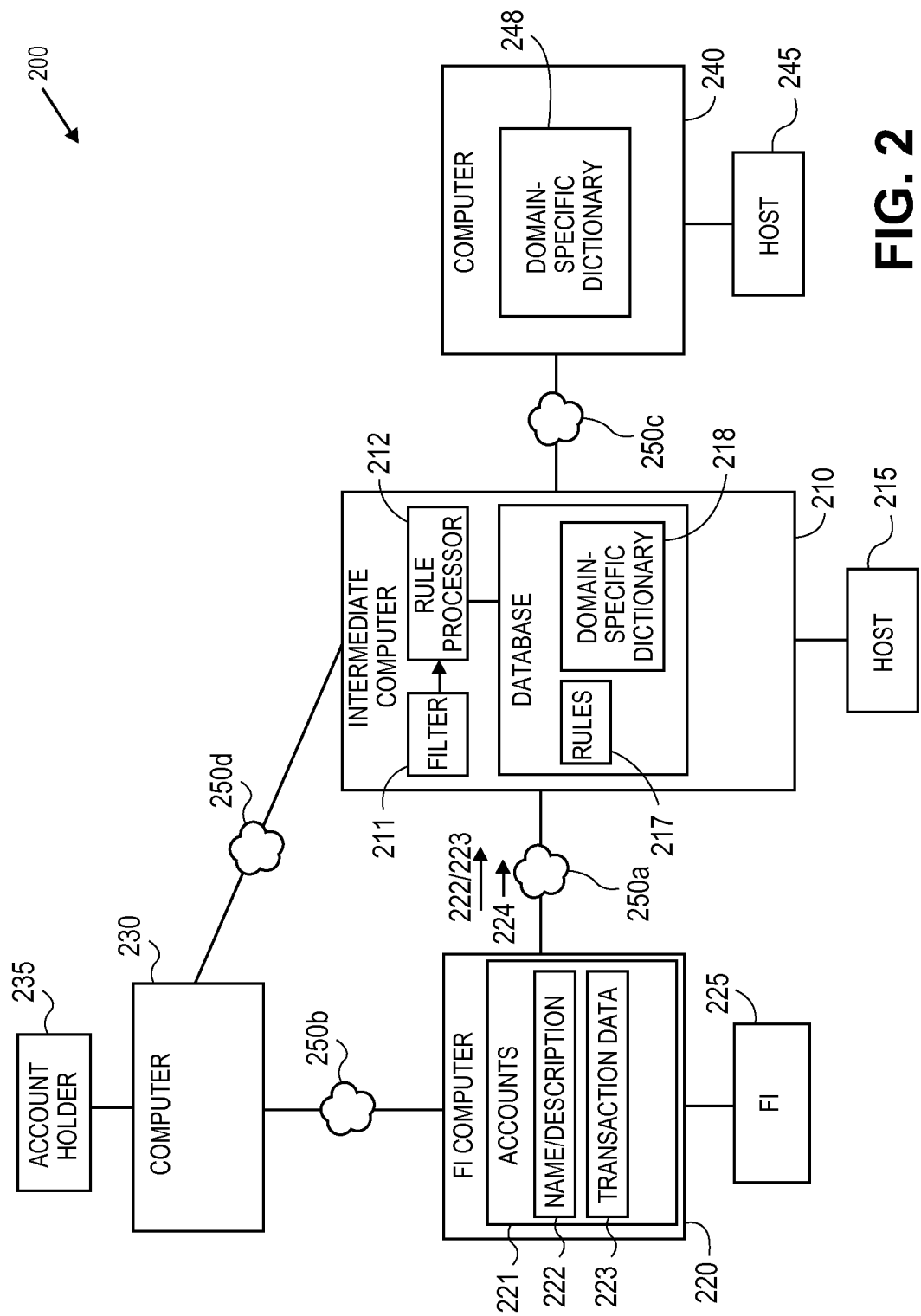
FIG. 2 is a block diagram of one embodiment of a system configured for discovering, identifying or classifying on-line banking accounts that are business accounts or utilized for business or both personal and business purposes.
Figure 3:
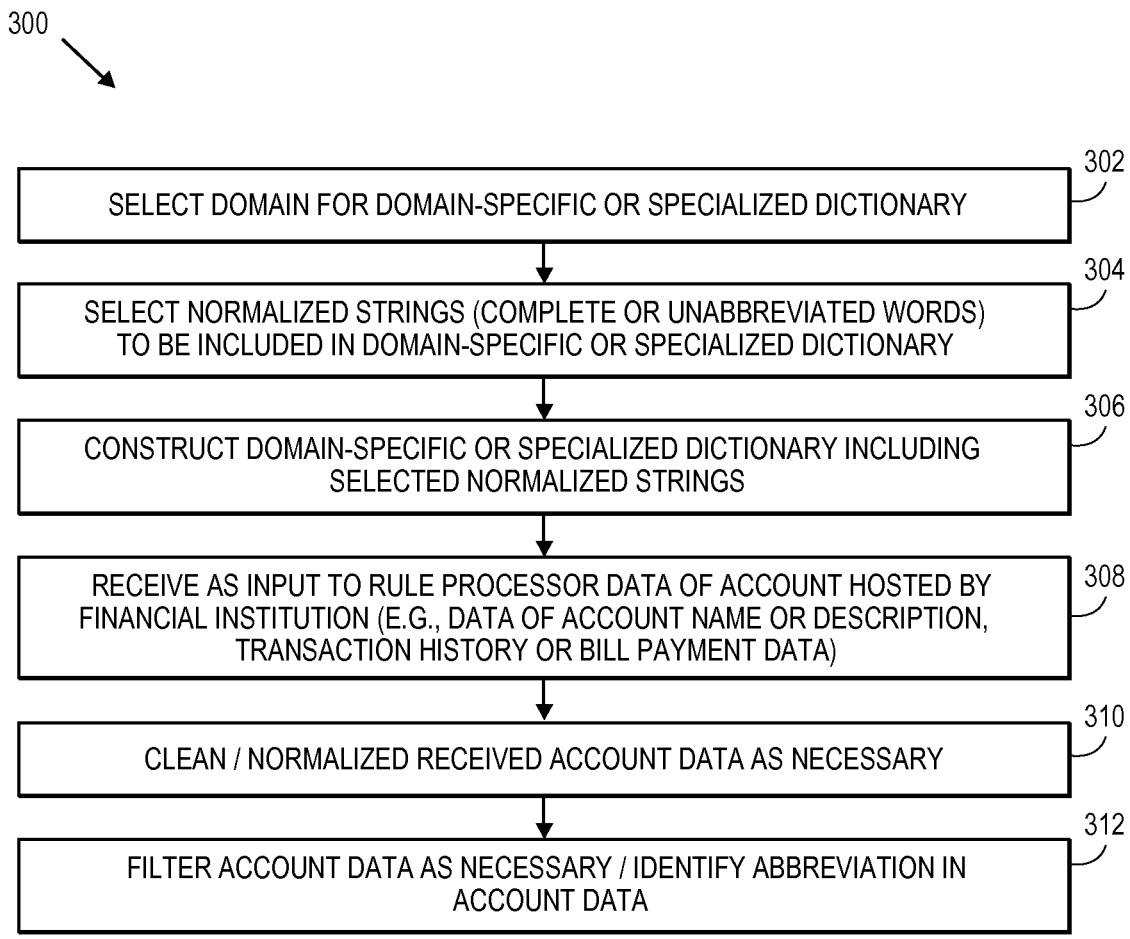
FIG. 3 is a flow diagram illustrating further details of one embodiment of a method for discovering, identifying or classifying on-line banking accounts that are business accounts or utilized for business or both personal and business purposes utilizing a hybrid edit distance metric.

Referring to FIG. 2, a system 200 configured or operable to determine whether an on-line banking account is a business account or utilized for business purposes, or to classify or categorize the account, comprises or involves a computer 210 managed by a host 215 and a computer 220 of a financial institution 225 (generally, FI 225 as shown in FIG. 2) that manages on-line banking accounts 221 (generally, account 221) of respective users, customers or account holders (generally, "account holder" 235). The accounts 221 may be savings, checking, money market, credit card and other types of accounts with associated account data (such as balances), account names or descriptions 222 and account transaction histories 223 (such as deposits, withdraws, electronic bill payments to a payee). For ease of explanation, reference is made to an account 221, and a description 222 or transaction history 223 of the account 221, but it should be understood that a name and description are both meant to refer to user entered text to identify the account 221.

In the illustrated embodiment, account holders 235 may utilize their computers 230 to access an account 221 by communicating with the FI computer 220. In other system configurations, the host 215 may offer on-line banking services such that the account holder 235 accesses the account 221 hosted by the FI 220 through the host or intermediate computer 210 (generally, intermediate computer 210). One example of a host 215 that offers such services is Intuit Inc., Mountain View, Calif. For this purpose, the account holder 235 may utilize a computer 230 such as a desktop or laptop computer, a tablet computing device, a smartphone or other mobile or computing device capable of communicating with host computer 210 and/or FI computer 220 through respective networks, and may utilize a browser to navigate screens presented to view and manage an account 221.

The host or intermediate computer 210 receives data such as account descriptions 222 from the FI computer 220. For this purpose, the intermediate computer may receive a description 222 in its original form and then, as necessary, filter 211 the description 222 to identify one or more abbreviations 224 within the description 222. For example, if filtering 211 is required, filtering may be performed by comparing the description 222 to complete words or normalized strings within a dictionary to identify abbreviations 224 that are not included in the complete word or complete string dictionary. An abbreviation 224 may also be identified by the presence of one or more periods within the description, e.g., "Assn." or "Corp." The intermediate computer 210 may also receive one or more abbreviations 224 that were identified by the FI 225 or FI computer 220. Further, the intermediate computer 210 may receive one or more abbreviations 224 identified by another program such as described in U.S. application Ser. No. 13/192,453, filed on the same date herewith, issued as U.S. Pat. No. 8,341,081 on Dec. 12, 2012, the contents of which were previously incorporated herein by reference, and which describes a parser or tokenizer utilized to generate text segments, which may include one or more abbreviations 224 identified by the parser or tokenizer.

Thus, it will be understood that abbreviations 224 of account descriptions 222 to be analyzed according to embodiments may be identified or received in various ways and received from various sources. Accordingly, FIG. 2 illustrating a filter 211 is provided to show one way in which abbreviations 224 to be analyzed may be identified, but it will be understood that abbreviations 224 can be identified in various other ways, and that such filtering 211 is optional.

A rule processor or engine 212 (generally, rule processor 212) executes or applies rules 217 to abbreviation—normalized string pairs to determine their respective edit distances (described in further detail below). One or more databases 216 store rules 217 and one or more domain-specific or specialized dictionaries 218.

For example, according to embodiments involving identifying or classifying a business account, the dictionary 218 utilized for this purpose is a business-specific dictionary including often used or popular business terms. These terms are not abbreviations 224 and instead are full text, regular words, otherwise referred to as normalized strings. Thus, a business-specific or other domain-specific dictionary 218 is not a general purpose or standard dictionary and instead is a subset of normalized strings related to a particular topic, such as business.

The domain-specific dictionary 218 is accessed by the rule processor 212 when applying rules 217. In the illustrated embodiment, the computer 210 hosts the domain-specification dictionary, which may be internal data resource and/or the computer 210 may access another computer 240 managed by another host 245 that has one or more domain-specific dictionaries 248. For ease of explanation, reference is made generally to a domain-specific dictionary 218, and in particular, a business-specific dictionary, but it will be understood that embodiments may involve one or more domains and that a domain-specific dictionary 218 may be managed by host 215 or a third party or other host 245.

For purpose of communication among system 200 components, the intermediate computer 210 is operably coupled to or in communication with the FI computer 220, account holder computer 230 and one or more computers 240 if necessary through respective networks 250a-c, and account holder computer 230 and intermediate computer 210 may be in communication with each other through network 250d. Examples of networks 250a-d (generally, network 250) and other networks discussed herein that may be utilized for communications between system 200 components include but are not limited to a Local Area Network (LAN), a Wide Area Network (WAN), Metropolitan Area Network (MAN), a wireless network, other suitable networks capable of transmitting data, and a combination one or more or other networks. For ease of explanation, reference is made to a network 250 generally, but various networks 250, combinations of networks 250 and communication systems, methods and protocols may be utilized Referring to FIG. 3, one embodiment is directed to a method 300 for determining, discovering or identifying an on-line banking account 221 that is a business account, utilized for business purposes or utilized for both personal and business purposes, or classifying the business account 221. For ease of explanation, reference is made to determining whether an account 221 is utilized for business purposes (e.g., for depositing business-related checks, making business-related payments, or a probability or likelihood, that the account 221 is utilized for business purposes).

Figure 4:
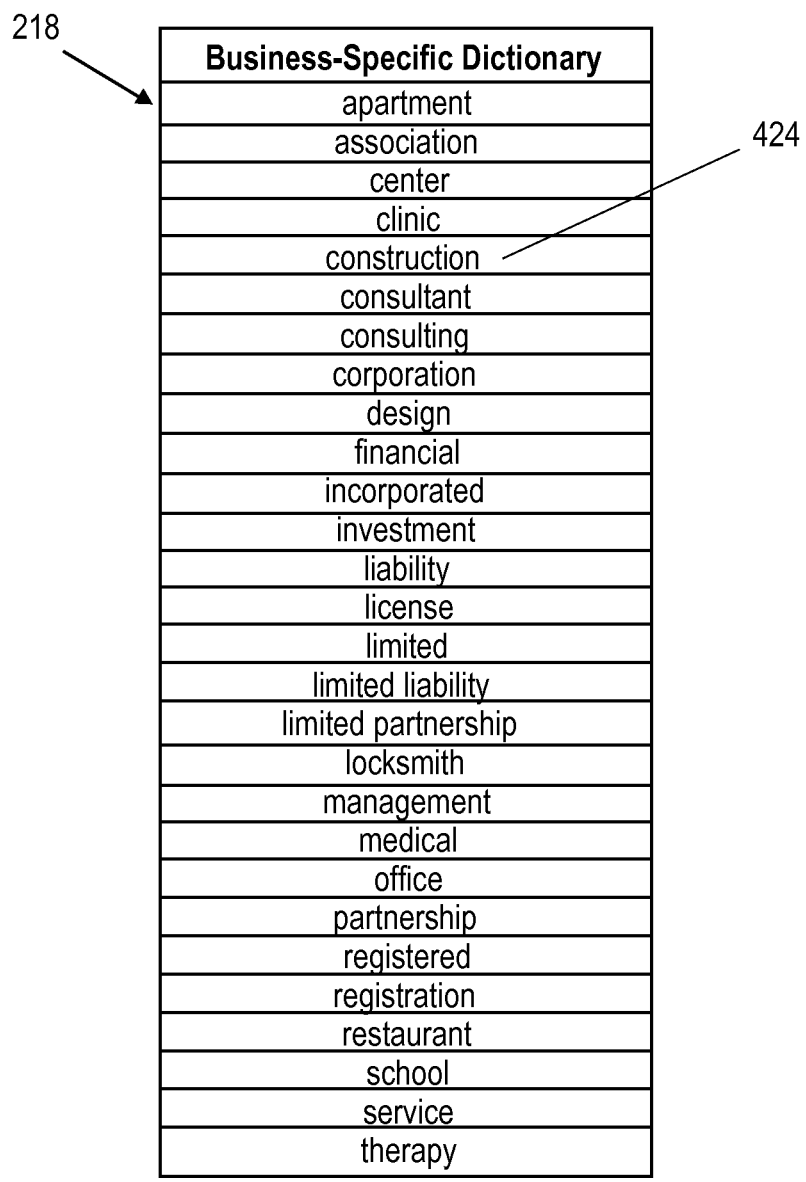
FIG. 4 illustrates an example of a domain-specific reference dictionary that may be utilized in embodiments involving analysis of descriptions or names of on-line banking accounts.

Referring to FIG. 4, one example of a business-specific reference dictionary 218 includes normalized strings 424 that are common business terms such as association, corporation, management, partnership, service, etc. It will be understood that FIG. 4 is provided as an example of how a business-specific reference dictionary 218 may be constructed, and that the business-specific reference dictionary 218 may include other numbers of normalized strings 424.

Referring again to FIG. 3, after construction of a business-specific reference dictionary 218 (if necessary), at step 308, the rule processor 212 receives as an input data of account 221 by a FI 225 (e.g., data of account name or description 222, transaction history 223 or bill payment data). Reference is made to account data 222 in the form of a description of an account 221 for ease of explanation. At step 310, the account data 222 is cleaned and/or normalized as necessary (e.g., by making all letters lower case or removing certain punctuation so that data is in a standard format), and filtering 211 the account data 222 as necessary to identify an abbreviation 224 in account data 222 to be analyzed.

Figure 5:
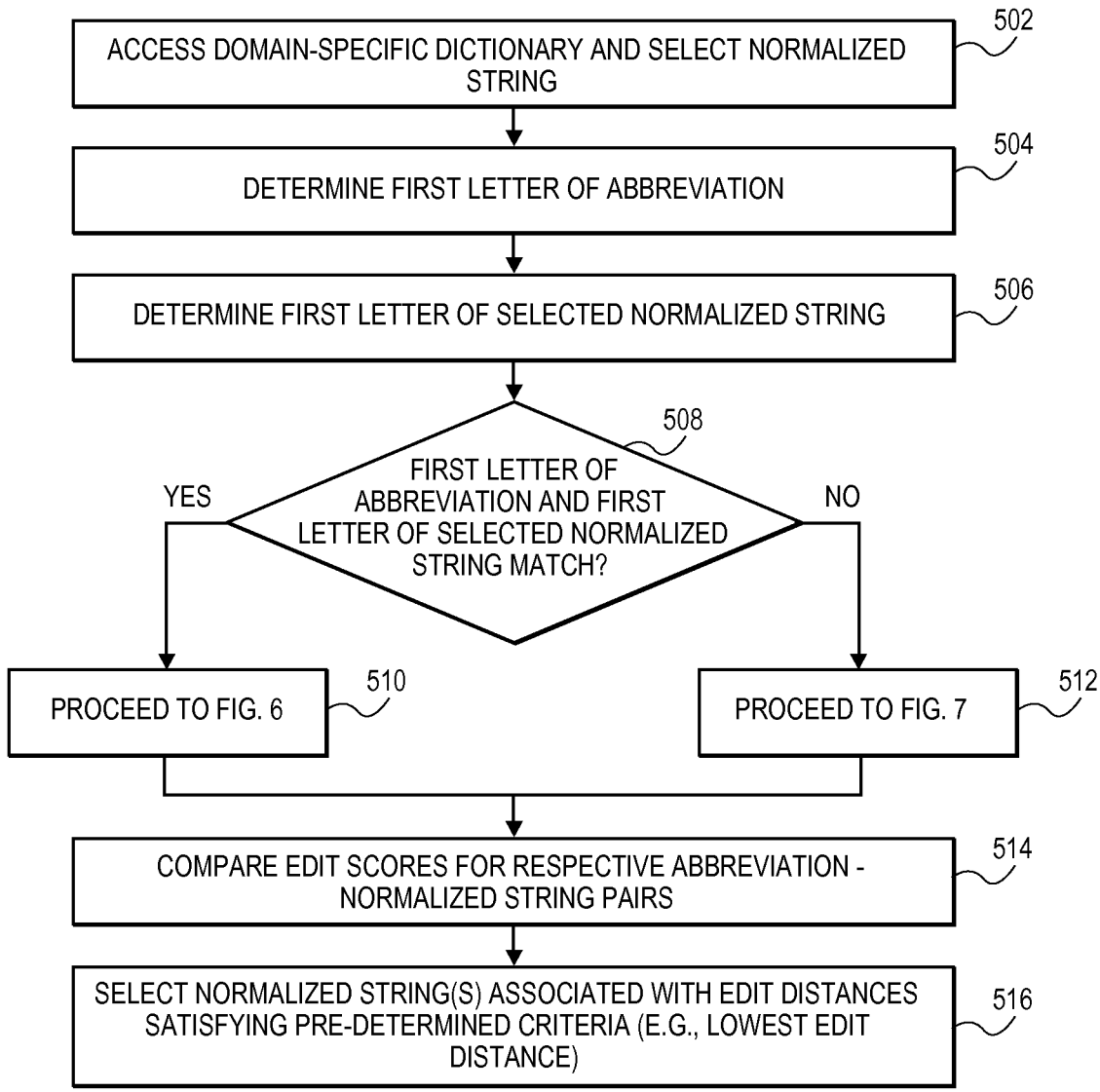
FIG. 5 is a flow diagram of one embodiment of a method for determining which rules to apply to an abbreviation—normalized string pair based on a comparison of first letters of the abbreviation and normalized string.

Referring to FIG. 5, at step 502, the rule processor 212 accesses the business-specific reference dictionary 218 and selects a normalized string 4242 to form an abbreviation 224—normalized string 424 pair for analysis. At step 504, the rule processor 212 determines the first letter of the abbreviation 224, and at 506, determines a first letter of the selected normalized string 424.

At step 508, the rule processor 212 compares the first letters of the abbreviation 224 and the normalized string 424 to determine which rules 217 to apply to the abbreviation 224 —normalized string 424 pair. If the first letters match, then the rule processor 212 proceeds to step 510 (and FIG. 6), but if they do not match, the rule processor 212 proceeds to step 512 (and FIG. 7).

Figure 6:
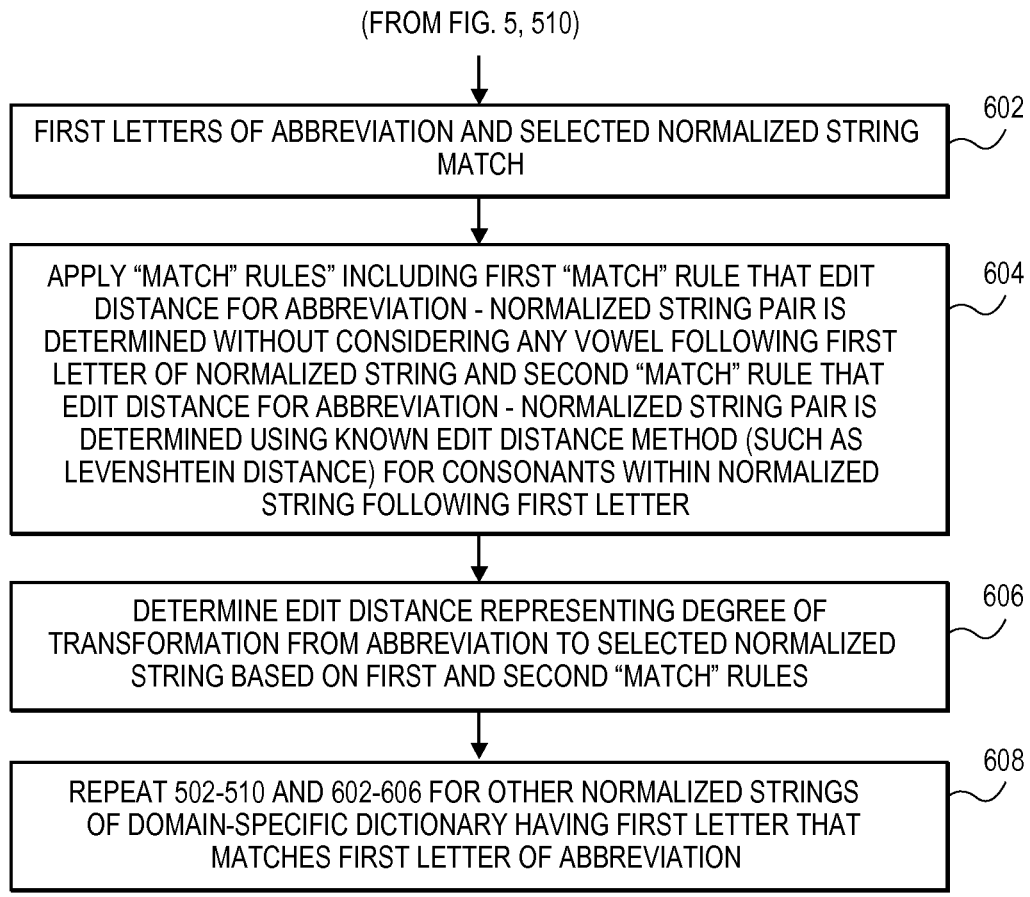
FIG. 6 is a flow diagram of one embodiment of a method for applying "match" rules involving a hybrid edit distance metric to an abbreviation—normalized string pair if the first letters of the abbreviation and normalized string match.

Referring to FIG. 6, at step 602, if the first letters of the abbreviation 224 and the selected normalized string 424 match, then at step 604, the rule processor 212 applies one or more "match" rules 217 to the abbreviation 224 and normalized string 424 pair.

According to one embodiment, one or more match rules 217 include or involve what is referred to as the "Wang distance" (named after applicant), which is a hybrid metric or hybrid edit distance for expressing an amount of difference or degree of transformation between the abbreviation 224 and the normalized string 424, but that is applied to some, but not all, letters of a normalized string 424.

"Edit distance" is often used to refer to a Levenshtein distance, which is well known particular method of measuring an amount of difference between two sequence and is the minimum number of edits needed to transform one string into the other using limited types of operations: insertion, deletion, or substitution of a single character. For example, the Levenshtein distance between "kitten" and "sitting" is 3, since the following three edits change one sequence into the other: kitten→sitten (substitution of 's' for 'k'), sitten→sittin (substitution of 'i' for 'e'), sittin→sitting (insertion of 'g' at the end). Other types of known edit distance determinations include, for example, the Damerau-Levenshtein distance, which allows addition, deletion, substitution, and the transposition of two adjacent characters, and the Hamming distance, which allows only substitution (and hence, only applies to strings of the same length).

In contrast to the Levenshtein and other known distances described above, a first rule 217 of a Wang distance determination according to embodiments involves determining an edit distance or representation or indication of a degree of change or transformation from the abbreviation 224 to the normalized string 424 without considering vowels in the normalized string 424 if the first letters of the abbreviation 224 and normalized string 424 match.

According to another embodiment, step 604 involves an additional or second "match" rule 217 of a Wang distance determination. According to this embodiment, if the first letters of the abbreviation 224 and the normalized string 424 match as described above, then vowels are not considered in edit distance determinations, but consonants (e.g., all consonants) within the normalized string 424 that follow the first matching letter are analyzed using a known edit distance determination such as the Levenshtein distance. According to one embodiment, all consonants, but no vowels, following the first letter of the normalized string 424 are analyzed using the Levenshtein distance. According to other embodiments, one or more consonants may also be eliminated from Levenshtein distance determinations performed per the second match rule 217, while all vowels are omitted from Levenshtein distance determinations.

Thus, step 604 involves using the Wang distance for the first matching letter (in which vowels are not considered), and applying Levenshtein distance to consonants following the first letter. In other words, step 604 involves a hybrid or limited edit distance analysis of an abbreviation 224—normalized string 424 pair in which edit distance determinations such as a Levenshtein distance are made with respect to some, but not all, letters of a normalized string 424, and vowels are not considered.

Thus, the Wang distance is not, and is distinguished from, other known distance determinations such as the Levenshtein distance that involve no such vowel-consonant constraints or conditions. Unexpected benefits achieved by use of this hybrid method are described in further detail below with reference to various specific examples of how the Wang distance is determined and applied to more clearly identify a normalized string 424 corresponding to the abbreviation 224 and in a more pronounced way when compared to edit distances of other abbreviation 224—normalized string 424 pairs.

Referring again to FIG. 6, after applying the first and/or second "match" rules 217 or determining the Wang distance, at step 606, the edit distance representing the degree of transformation from the abbreviation 224 to the selected normalized string 424 based on first and second "match" rules is determined, and at step 608, steps 502-510 and 602-606 are repeated for other normalized strings 424 of the domain-specific dictionary 218 having a first letter that matches the first letter of the abbreviation 224. Thus, at 608, the rule processor 212 will generate one edit distance if there is one normalized string 424 having a first letter that matches the abbreviation 224, two edit distances if there are two normalized strings 424 having a first letter that matches the first letter of the abbreviation 224, three edit distances if there are three normalized strings 424 having a first letter than matches the first letter of the abbreviation 224, and so on.

Figure 7:
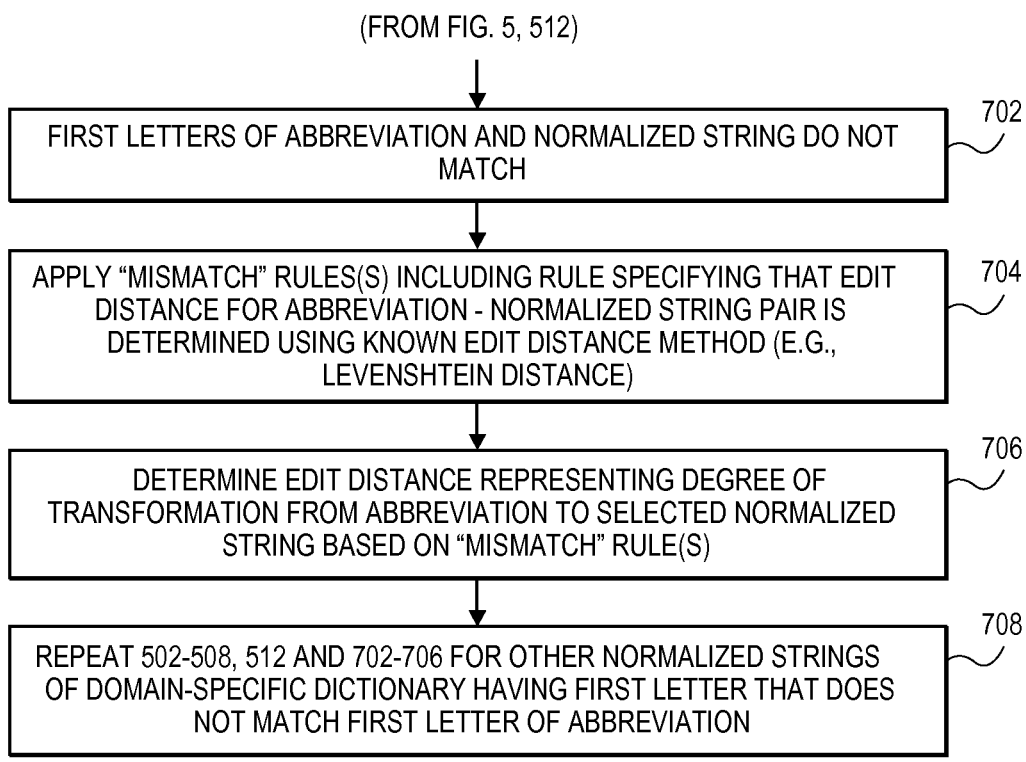
FIG. 7 is a flow diagram of one embodiment of a method for determining an edit distance if the first letters of the abbreviation and normalized string match.

Referring again to FIG. 5, and with further reference to FIG. 7, if step 508 results in the first letter of the abbreviation 224 not matching the first letter of the normalized string 424, then at step 512, the method proceeds to FIG. 7. Referring to FIG. 7, at 702, the first letter of the abbreviation 224 being analyzed and the first letter of a normalized string 424 do not match. As a result, at step 704, the rule processor 212 proceeds to apply one or more "mismatch" rules 217 including rule specifying that edit distance for an abbreviation 224—normalized string 424 pair is determined using known edit distance methods (e.g., Levenshtein distance). At step 706, the rule processor 212 determines an edit distance representing degree of transformation from abbreviation 224 to the selected normalized string 424 based on "mismatch" rule(s) 217, and at step 708, steps 602-608, 612 and 702-706 are repeated for other normalized strings 424 of domain-specific dictionary 218 having first letter that does not match first letter of abbreviation 224. Thus, the rule processor 212 determines a first Levenshtein (or other known) distance for a first abbreviation 224—normalized string 424 pair having first letters that do not match, a second Levenshtein (or other known) distance for a second abbreviation 224—normalized string 424 pair having first letters that do not match, a third Levenshtein (or other known) distance for a third abbreviation 224—normalized string pair 424 having first letters that do not match, and so on.

Referring again to FIG. 5, having applied the match rules 217, at step 514, the rule processor 212 compares the resulting edit distances or scores to pre-determined criteria (e.g., a certain maximum score), and at step 516, selects one or more normalized string(s) 424 as satisfying pre-determined criteria. According to one embodiment, the normalized string(s) 424 associated with the lowest determined edit distance is selected, and if multiple normalized strings 424 are selected, other criteria can be utilized as necessary.

The process described above can performed for accounts 221 of one or multiple FIs 225 that may analyze their own accounts 221, or a host 215 associated with the FIs 225 may perform the analysis for the FIs 225. After the accounts 221 are identified as being a business account, utilized for business purpose, or otherwise classified or categorized, the results can be reported the FIs 225 who may present other account cross-selling offers, opportunities or services to account holders 235 that be relevant to personal and/or business activities.

FIGS. 8A-E, 9A-F and 10A-E provide examples of how embodiments applying a hybrid distance determination involving the Wang distance result in substantially greater differences between edit distances so that with embodiments, normalized strings 424 that correspond to an abbreviation 224 can be identified more accurately compared to using traditional edit distance metrics alone since traditional edit distance metrics may generate similar results for very different normalized strings 424. This can make identifying the correct normalized string 424 difficult. More specifically, FIGS. 8A-E, 9A-F and 10A-E illustrate examples of how embodiments utilizing the Wang distance not only generate lower edit distances for normalized strings 424 that correspond to an abbreviation 224, but also how embodiments do so while making the differences between edit distances for an abbreviation 224—normalized string 424 that correspond to each other and an abbreviation 224—normalized string 424 that do not correspond to each other more pronounced so identification of the correct abbreviation 224—normalized string 424 is performed more easily compared to using known edit distance determinations along such as the Levenshtein distance.

Figure 8A:
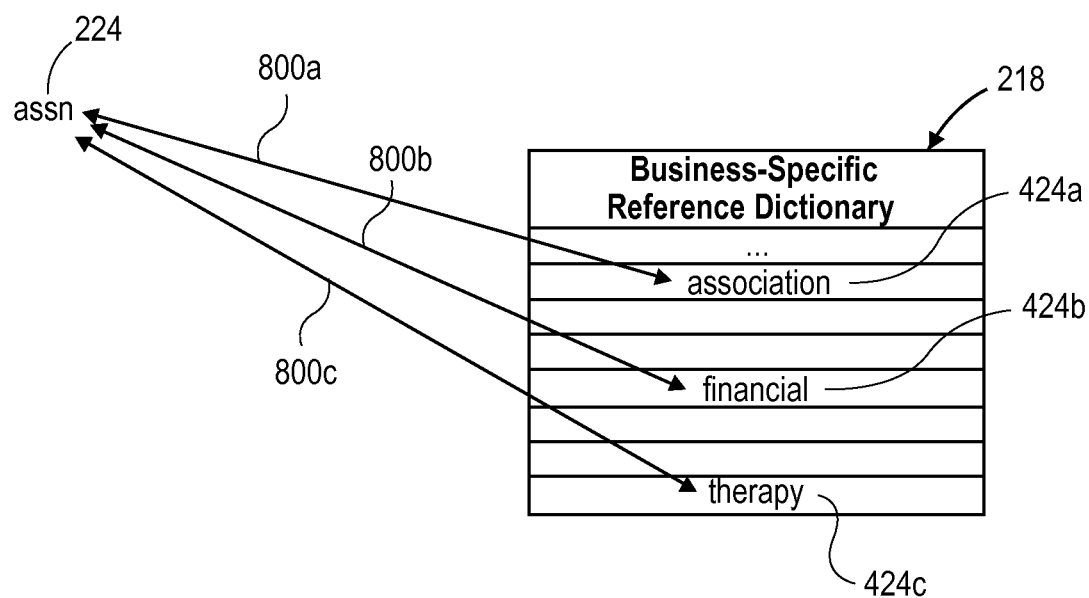

For example, referring to FIG. 8A, the business reference dictionary 218 includes normalized strings 424a-c including "association," "financial" and "therapy" and the abbreviation 224 within an account name or description 222 to be analyzed is "assn." Thus, this example involves three abbreviation—normalized string pairs 800a-c: assn—association, assn—financial, and assn—therapy. The normalized string "association" 424a is the correct normalized string that corresponds to the abbreviation 224 "assn." whereas the other normalized strings 424b-c "financial" and "therapy" do not and should not be selected by the rule processor since they are not related to the abbreviation 224. It will be understood that the reference dictionary 218 can include other numbers of normalized strings 424, and that FIG. 8A is provided as an example to illustrate how embodiments are able to more easily and accurately identify a normalized string 424 corresponding to an abbreviation 224.

FIG. 8B illustrates how the known Levenshtein distance is determine for the abbreviation "assn" 224 and normalized string "financial" 424b and the associated insertions, replacements and deletions of vowels and consonants resulting in an edit distance 810a of "9." In other words, nine permitted changes to "assn" 224 are required to transform "assn" 224 to the unrelated and very different normalized string "financial" 424b.

FIG. 8C illustrates how the Levenshtein distance is determined for the abbreviation "assn" 224 and the normalized string "therapy" 424c and the associated replacements and insertions of vowels and consonants resulting in an edit distance 810c of "7." In other words, seven permitted changes to "assn" 224 are required to transform "assn" 224 to the unrelated and very different normalized string "therapy" 424c.

FIG. 8D illustrates how the Levenshtein distance is determined for the same abbreviation "assn" 224 and the normalized string "association" 424a and the associated insertions of vowels and consonants resulting in an edit distance 810d of "7." In other words, seven permitted changes to "assn" 224 are required to transform "assn" 224 to the related normalized string "association" 424a. Thus, both of the normalized strings "association" 424a, which is the correct normalized string for the abbreviation "assn." 224, and "financial" 424b, which is not the correct normalized string for the abbreviation "assn." 224, have the same Levenshtein distance of 7. Thus, FIGS. 8B and 8D illustrate how the Levenshtein distance was not able to differentiate the normalized string 424a that actually corresponds to the abbreviation 224 and an unrelated normalized string 424b. Further, given that there may be a multitude of other abbreviation—normalized string pairs 800 analyzed by the rule processor 212 there may be a number of other pairs 800 with edit distances of 7, 8 and 9, thus making it even more difficult to distinguish the correct normalized string 424a from unrelated normalized strings based on the use of Levenshtein distance alone.

Referring to FIG. 8E, with embodiments, the rule processor 212 determines that the assn—association pair 800a have matching first letters "a" 815 thus invoking match rule or Wang difference 217 that specifies that Levenshtein determinations are not applied to vowels within the normalized string 424a following the matching "a" 815 Thus, with embodiments, involving application of the Wang distance (in which vowels are not the subject of edit distance determinations, but consonants are), applying the Levenshtein distance to the remaining consonants following the first matching letter 815 results in an edit distance 820 determined according to embodiments of only "2."

This low edit distance 820 of "2" generated according to embodiments for the correct abbreviation—normalized string pair 800a is much less than the edit distance 810d of "7" using only the Levenshtein distance as explained above. Accordingly, embodiments significantly enhance identification of the correct abbreviation—normalized string pair 800a in a number of ways.

First, embodiments generate a substantially lower edit distance to indicate more clearly which normalized string 424 corresponds to the abbreviation 224. Second, embodiments provide a more pronounced difference between the edit distance for the correct abbreviation—normalized string pair and edit distances for abbreviation—normalized string pairs that should not be selected. In this example, embodiments shown in FIGS. 8B-C and 8E resulted in an edit distance of 2 for the correct normalized string 424a whereas edit distances of 7 and 9 were generated for incorrect normalized strings. These substantial edit distance differences (2 vs. 7 and 2 vs. 9) are much more pronounced compared to edit distances of 7, 7, and 9 generated using only the Levenshtein distance, as shown in FIGS. 8B-D.

Figure 9A:
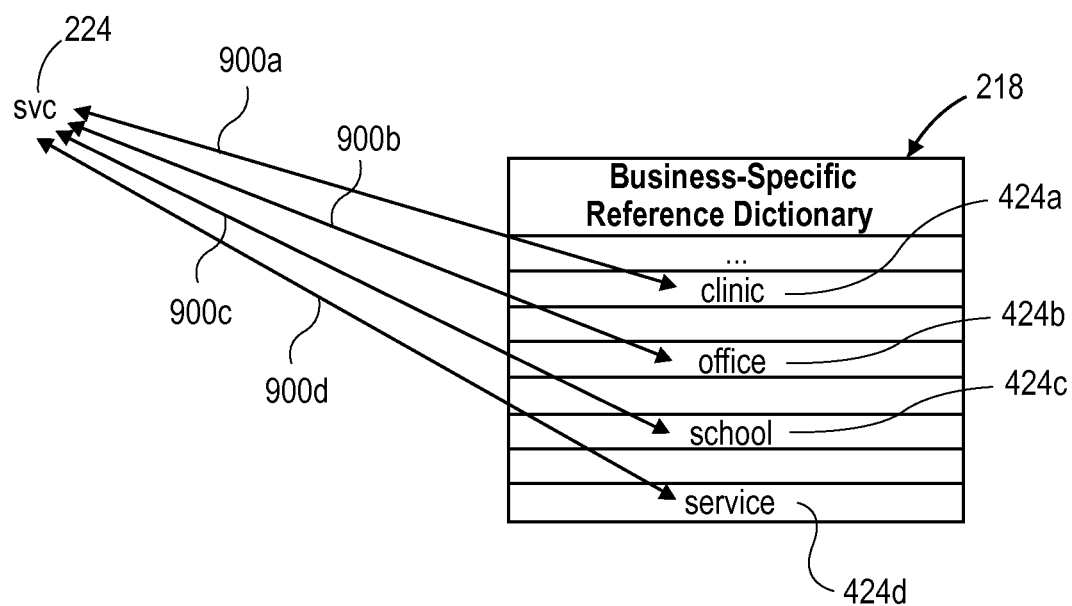

FIGS. 9A-F illustrate another example of how embodiments are able to more accurately and easily identify a normalized string 424 using a hybrid edit distance method. Referring to FIG. 9A, the business reference dictionary 218 includes normalized strings 424a-d including "clinic," "office," "school" and "service" and the abbreviation 224 within an account name or description 222 to be analyzed is "svc" Thus, this example involves four abbreviation—normalized string pairs 900a-d: svc—clinic, svc—office, svc—school, and svc—service. The normalized string "service" 424d is the correct normalized string that corresponds to the abbreviation 224 "svc" whereas the other normalized strings 424a-c "clinic," "office" and "school" do not and should not be selected by the rule processor 212 since they are not related to the abbreviation 224. It will be understood that the reference dictionary 218 can include other numbers of normalized strings 424, and that FIG. 9A is provided as an example to illustrate how embodiments are able to more easily and accurately identify a normalized string 424 corresponding to an abbreviation 224.

FIG. 9B illustrates how the known Levenshtein distance is determined for the abbreviation "svc" 224 and normalized string "clinic" 424a and the associated replacements and insertions of vowels and consonants resulting in an edit distance 910b of "5." In other words, five permitted changes to "svc" 224 are required to transform the abbreviation "svc" 224 to the unrelated and very different normalized string "clinic" 424a.

FIG. 9C illustrates how the Levenshtein distance is determined for the abbreviation "svc" 224 and the normalized string "office" 424b and the associated replacements and insertions of vowels and consonants also resulting in an edit distance 910c of "5." In other words, five permitted changes to the abbreviation "svc" 224 are required to transform "svc" 224 to the unrelated and very different normalized string "office" 424b.

FIG. 9D illustrates how the Levenshtein distance is determined for the same abbreviation "svc" 224 and the normalized string "school" 424c and the associated insertions of vowels and consonants resulting in an edit distance 910d of "5." In other words, five permitted changes to "svc 224 are required to transform "svc" 224 to the unrelated normalized string "school" 424c.

FIG. 9E illustrates how the Levenshtein distance is determined for the same abbreviation "svc" 224 and the normalized string "service" 424d and the associated insertions of vowels and consonants resulting in an edit distance 910e of "4." In other words, four permitted changes to "svc" 224 are required to transform "svc" 224 to the corresponding normalized string "service" 424d.

Thus, the Levenshtein distance 910e for the abbreviation—normalized string pair 900d is 4, which is only 1 less (and the smallest possible difference) than the other three edit distances 910b-d of 5. Thus, while the Levenshtein distance 910e is smaller than the others, distinguishing the correct normalized string 424d from the others can be difficult, particular considering that there may be a multitude of other abbreviation—normalized string pairs 900 analyzed by the rule processor 212 there may be a number of other pairs 900 with edit distances of 4 and 5, thus making it even more difficult to distinguish the correct normalized string 424d from unrelated normalized strings based on the use of Levenshtein distance alone.

Referring to FIG. 9F, with embodiments, the rule processor 212 determines that the assn—association pair 900d have matching first letters "s" 915 thus invoking match rule or Wang difference 217 that specifies that Levenshtein determinations are not applied to vowels within the normalized string 424d following the matching "s" 915 Thus, with embodiments, involving application of the Wang distance (in which vowels are not the subject of edit distance determinations, but consonants are), applying the Levenshtein distance to the remaining consonants following the first matching letter 915 results in an edit distance 920 determined according to embodiments of only "3." This edit distance (3) is lower than the edit distance 910*e* resulting from application of the Levenshtein distance alone, and also provides 100% more difference (3 vs. 5 compared to 4 vs. 5) to distinguish the correct normalized string 424*d* from the others that have edit distances 910*b-d* of "5" in this example. Accordingly, embodiments significantly enhance identification of the correct abbreviation—normalized string pair 900*d* by generating a lower edit distance that indicates more clearly which normalized string 424 corresponds to the abbreviation 224, and by increasing the difference between that lower edit distance and other end distances of unrelated normalized strings 424.

Figure 10A:
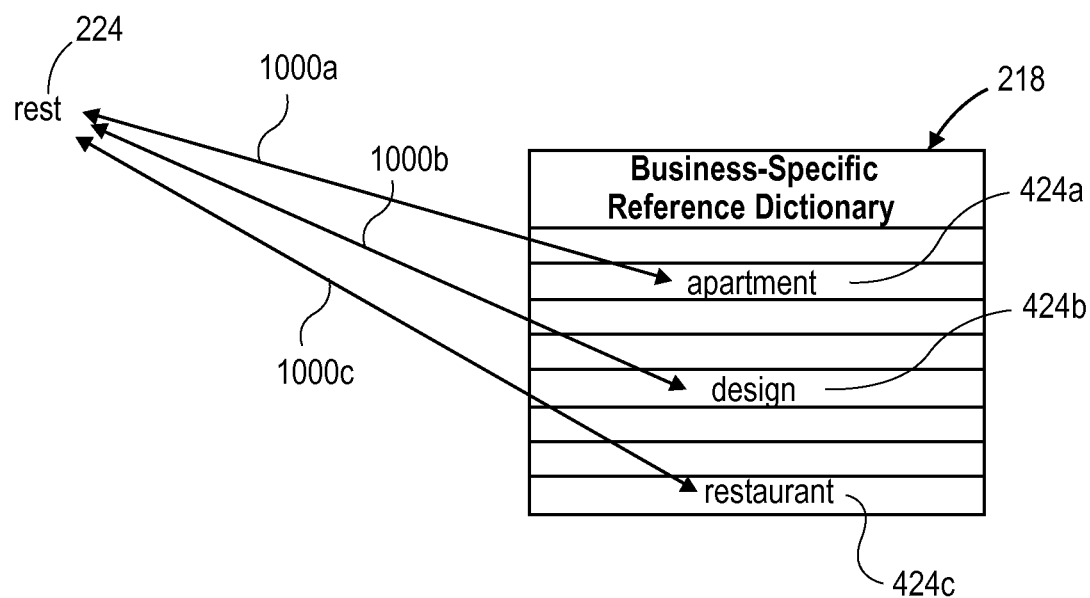

FIGS. 10A-E illustrate another example showing how embodiments more accurately identify the correct normalized string while doing so with a more pronounced difference between edit distances for the correct normalized string and normalized strings that should not be selected. In the illustrated example, FIG. 10A illustrates a business reference dictionary 218 that includes normalized strings 424*a-c* "apartment," "design" and "restaurant" and the abbreviation "rest" 224 within an account name or description 222 to be analyzed. Thus, this example involves three abbreviation—normalized string pairs 1000*a-c*: rest—apartment, rest—design and rest—restaurant. The normalized string "restaurant" 424*c* is the correct normalized string that corresponds to the abbreviation "rest" 224, whereas the other normalized strings "apartment" and "design" 424*a-b* do not and should not be selected by the rule processor 212.

FIG. 10B illustrates how the Levenshtein distance is determined for the abbreviation "rest" 224 and normalized string "apartment" 424*a* and the associated replacements and insertions of vowels and consonants resulting in an edit distance 1010*b* of "7."

FIG. 10C illustrates how the Levenshtein distance is determined for the same abbreviation "rest" 224 and a normalized string "design" 424*b* and the associated replacements and insertions of vowels and consonants resulting in an edit distance 1010*c* of "4."

FIG. 10D illustrates how the Levenshtein distance is determined for "rest" 224 and the corresponding normalized string "restaurant"424*c* and the associated insertions of vowels and consonants resulting in an edit distance 1010*d* of "6."

Thus, while the edit distance 1010*d* (6) for the rest—restaurant pair 1000*c* is less than the edit distance 1010*b* (7) for the rest—apartment pair 1000*a*, the edit distance 1010*d* (6) is only 1 less than the edit distance 1010*b* (and is the smallest possible difference).

Further, the edit distance 1010*d* (6) for rest—restaurant pair 1000*c* is actually 50% higher than the edit distance for the rest—design pair 1000*c*. Thus, if the criteria employed by the rule processor 212 was to select the normalized string resulting in the lowest edit distance, users of the Levenshtein distance alone would select the incorrect normalized string, namely, "design"424*b* rather than "restaurant." 424*c* since "design" 424*b* is associated with an edit distance of 3, which is much lower than the edit distance of 6 with which "restaurant" is associated.

On the other hand, using embodiments as shown in FIG. 10E, the rule processor 212 determines that the rest—restaurant pair 1000*c* has matching first letters 1015 "r" thus invoking the match rule or Wang difference 217 that specifies that Levenshtein determinations are not applied to vowels within the normalized string 424*c* following the matching "r" 1015 Thus, with embodiments, involving application of the Wang distance (in which vowels are not the subject of edit distance determinations, but consonants are), the edit distance 1020 resulting from applying the Levenshtein distance to the consonants following the "r" is only "3."

Thus, in this example, the edit distance 1020 for the correct abbreviation—normalized string pair 1000*c* is only 3 when using embodiments compared to 6 using only the Levenshtein distance as explained above. Thus, embodiments are able to generate an edit distance 1020 that is less the all of the other edit distances 1010*b-d* in this example such that embodiments significantly enhance identification of the correct normalized string 424*c* based on a lower edit distance 1020 that indicates more clearly which normalized string 424*c* corresponds to the abbreviation 224. Further, embodiments provide a more pronounced or identifiable difference between the edit distance 1020 for the correct abbreviation—normalized string pair 1000*c* and edit distances 1010*b-d* for other abbreviation—normalized string pairs 1000*a-b* that should not be selected by the rule processor 212.

It will be understood that while FIGS. 8A-10E provide illustrating examples showing the substantial enhancements achieved by use of a hybrid edit distance or Wang distance determination based on matching first letters of an abbreviation—normalized string pair, it will be understood that embodiments may not result in 100% accuracy, particularly as more normalized strings are analyzed. However, FIGS. 8A-10E demonstrate how embodiments can significantly improve correct identification of a normalized string corresponding to an abbreviation based on an edit distance analysis, and how such selection can be performed more easily due to the more pronounced edit distance differences achieved by use of embodiments.

Figure 11:
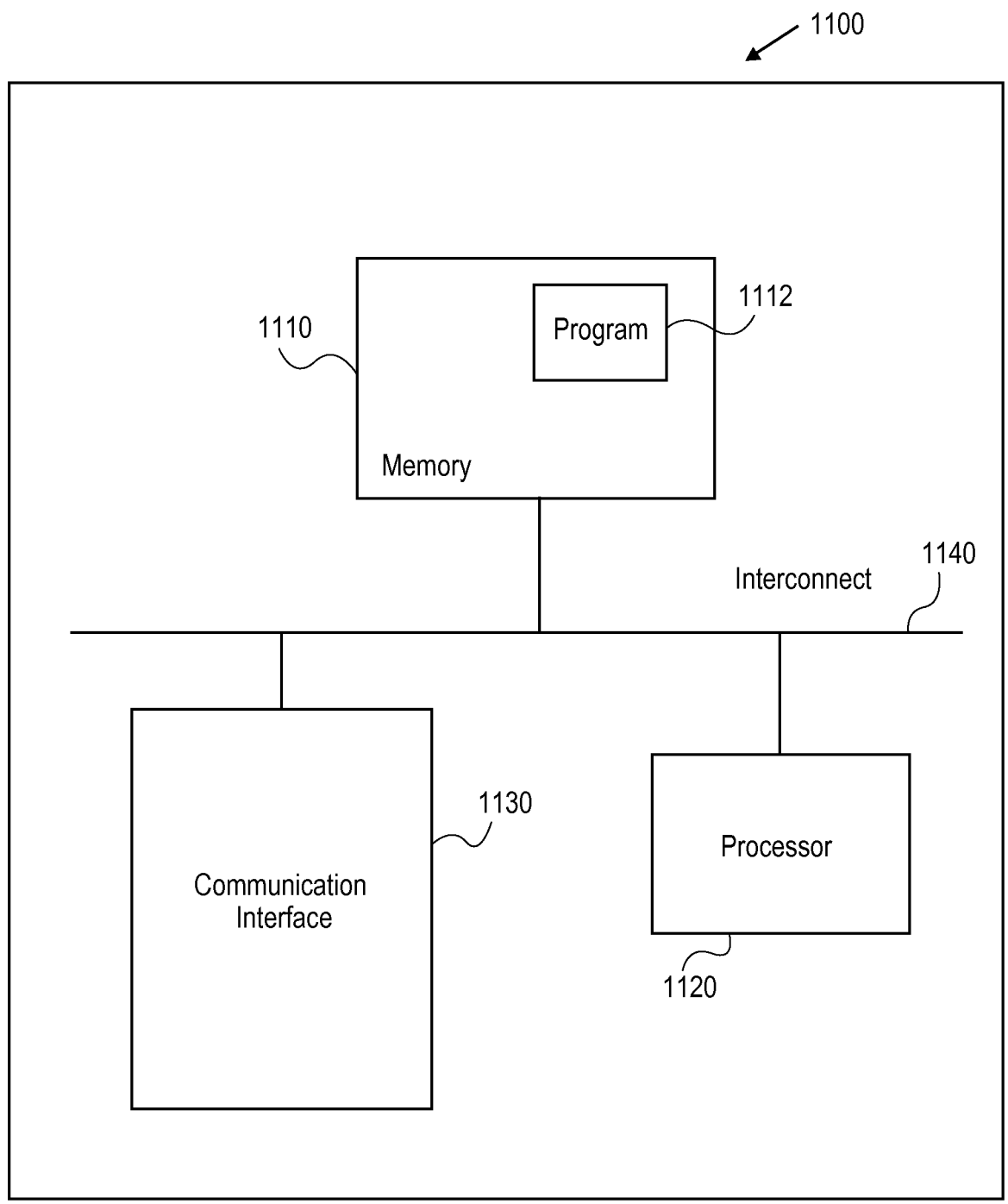
FIG. 11 is a block diagram of a computing apparatus or system in which various embodiments may be implemented or that may be utilized to execute various embodiments.

FIG. 11 generally illustrates certain components of a computing device 1100 that may be utilized to execute embodiments and that includes a memory 1110, program instructions 1112, a processor or controller 1120 to execute instructions 1112, a network or communications interface 1130, e.g., for communications with a network or interconnect 1140 between such components. The memory 1110 may be or include one or more of cache, RAM, ROM, SRAM, DRAM, RDRAM, EEPROM and other types of volatile or non-volatile memory capable of storing data. The processor unit 1120 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1140 may include a system bus, LDT, PCI, ISA, or other types of buses, and the communications or network interface may, for example, be an Ethernet interface, a Frame Relay interface, or other interface. The network interface 1130 may be configured to enable a system component to communicate with other system components across a network which may be a wireless or various other networks. It should be noted that one or more components of computing device 1100 may be located remotely and accessed via a network. Accordingly, the system configuration provided in FIG. 11 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1120 performs steps or executes program instructions 1112 within memory 1110 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may involve a FI computer embodying the rule processor so that the FI itself performs the processing. In other embodiments, a third part or host performs the analysis and may then inform the FI of the results.

Additionally, while certain embodiments are described with reference to analyzing abbreviations within an account name or description, embodiments may involve analysis of abbreviations within electronic transaction data (such as payee names of electronic bill payments).

Moreover, while certain embodiments are described with reference to determining whether an account is a business account or utilized for business purposes, or classifying business accounts or activities based on semantic meanings of abbreviations as determined by determined normalized strings, embodiments may also be utilized to analyze other types of data feeds to identify a business associated with the feed and provide additional information to the user of the data feed to enrich or enhance the data feed content provided to the user.

For example, another embodiment is directed to identifying or classifying a business associated with a web feed and providing additional information about the identified business. The method involves a rule processor receiving the web feed from an on-line source (such as a website, a social networking site such as TWITTER or FACEBOOK, or a Really Simply Syndication (RSS) feed), and receiving or determining an abbreviation present within the web feed. The rule processor applies rules to each abbreviation as noted above, e.g., by applying the Wang distance to abbreviation—normalized string pairs having first letters that match such that vowels are not considered in edit distance determinations, but consonants (e.g., all consonants) within the normalized string 424 that follow the first matching letter are, e.g., using the Levenshtein distance.

Additionally, while embodiments are described with reference to analyzing business-related normalized strings of a business-domain specialized dictionary, embodiments may be utilized in other applications and areas other than business such as various sciences and other areas.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method for selecting and performing optimized processing for determining whether an on-line banking account is utilized for business purposes based on a meaning associated with an abbreviation in an electronic description of the on-line banking account, the method comprising:

receiving or determining, by an intermediate computer in communication with a computer of a financial institution and a computer of an account holder through respective networks, the electronic description of the on-line banking account the account holder has at the financial institution, the electronic description comprising the abbreviation;

accessing, by a rule processor comprising computer-executable instructions executed by a processor of the intermediate computer, a data store comprising a set of rules and a plurality of pre-determined normalized strings;

applying, by the rule processor, the set of rules to the abbreviation and the plurality of pre-determined normalized strings to select processing for determining respective edit distances representing respective degrees of transformation from the abbreviation to respective pre-determined normalized strings, the set of rules comprising:

a first rule specifying that when a first letter of the abbreviation is the same as the first letter of the normalized string for a pair comprising the abbreviation and a normalized string, then first processing for determining an edit distance for the pair is to be applied, the first processing determining the edit distance without considering any vowel appearing after a first letter of the normalized string, a second rule specifying that when the first letter of the abbreviation is the same as the first letter of the normalized string, then second processing for determining the edit distance for that pair is to be applied by the intermediate computer applying at least one of a Levenshtein distance, a Damerau-Levenshtein distance, and a Hamming distance to all consonants of the normalized string following the first letter, and a third rule specifying that when the first letter of the abbreviation is not the same as the first letter of the normalized string, then third processing for determining the edit distance is to be applied by the intermediate computer applying at least one of the Levenshtein distance, the Damerau-Levenshtein distance, and the Hamming distance to all letters of the normalized string, wherein, for each respective pre-determined normalized string: the first processing is selected in response to the first rule being satisfied, the second processing is selected in response to the second rule being satisfied, and the third rule is selected in response to the third rule being satisfied; performing, by the intermediate computer, the selected processing from among the first processing, second processing, and third processing to determine the respective edit distances representing the respective degrees of transformation from the abbreviation to the respective pre-determined normalized strings, wherein:
a first edit distance generated by performing the selected processing on a pair comprising the abbreviation and the normalized string selected as corresponding to the abbreviation is less than a second edit distance generated by applying the Levenshtein Distance to the pair comprising the abbreviation and the normalized string corresponding to the abbreviation, thereby more clearly indicating which normalized string of the plurality of normalized strings should be selected by the rule processor as corresponding to the abbreviation,
a first difference between the first edit distance and a third edit distance, determined by the rule processor applying the set of rules to a second pair comprising the abbreviation and a normalized string that does not correspond to the abbreviation and is larger than the first edit distance, is larger than a second difference between a fourth edit distance and a fifth edit distance determined by the Levenshtein distance, thereby more clearly indicating which normalized string of the plurality of normalized strings should be selected by the rule processor as corresponding to the abbreviation, wherein the fourth edit distance is determined by the Levenshtein distance to the pair comprising the abbreviation and the normalized string selected as corresponding to the abbreviation, and
the fifth edit distance is determined by execution of the Levenshtein algorithm to the second pair comprising the abbreviation and a normalized string that does not correspond to the abbreviation and is larger than the third edit distance;
selecting, by the rule processor, a normalized string from the plurality of pre-determined normalized strings as corresponding to the abbreviation based upon the determined respective edit distances for respective pairs of the abbreviation and respective normalized strings as obtained by the performing;
automatically determining, by the rule processor, whether the on-line banking account is utilized for business purposes based upon the selected normalized string indicating that the meaning associated with the abbreviation is business-related; and in response to determining that the on-line banking account is utilized for business purposes, displaying, by the rule processor, a message related to the on-line banking account through a display of the computer of the account holder.

2. The method of claim 1, the intermediate computer receiving the electronic description through a network from the computer of the financial institution.

3. The method of claim 1, the electronic description comprising a description of the on-line banking account that was entered or selected by the account holder.

4. The method of claim 1, the plurality of pre-determined normalized strings forming a specialized or domain-specific reference dictionary that is a subset of terms of a general dictionary and accessed by the rule processor.

5. The method of claim 4, further comprising: generating, by the intermediate computer, the specialized or domain-specific reference dictionary; and storing, by the intermediate computer, the specialized or domain-specific reference dictionary to the data store.

6. The method of claim 1, further comprising:
determining, by the intermediate computer, respective edit distances for respective pairs of the abbreviation and respective normalized strings; and selecting, by the rule processor, the normalized string of the pair having the lowest edit distance.

7. The method of claim 1, further comprising selecting, by the rule processor, a normalized string of a pair having an edit distance that is not an edit distance determined by the Levenshtein distance Hamming distance or the Damerau-Levenshtein distance.

8. The method of claim 1, wherein multiple account holders have respective on-line banking accounts at the financial institution, the method further comprising applying, by the rule processor, the set of rules to respective descriptions of respective multiple on-line banking accounts of respective account holders in order to determine which of the respective on-line banking accounts are business accounts or utilized for business purposes.

9. The method of claim 1, further comprising: automatically determining, by the rule processor, that the on-line banking account is an account of a business; and presenting, by the intermediate computer, wherein the message comprises an offering of a good or service to the account holder, the offering being related to the business.

10. The method of claim 1, further comprising: automatically determining, by the rule processor, that the on-line banking account is an account of a business; and presenting, by the intermediate computer, wherein the message comprises an incentive to the account holder to remain at the financial institution.

11. The method of claim 1, wherein the intermediate computer receives the description from the account holder when the on-line banking account is opened, wherein the description does not identify the account holder as a business or indicate that the account is utilized for business purposes.

12. The method of claim 1, wherein the intermediate computer receives the description from the account holder when the account holder opened the on-line banking account with the financial institution.

13. The method of claim 1, the on-line banking account including at least one of a savings account, a checking account, a money market account, and a credit card account.

14. The method of claim 1, further comprising:
receiving or determining, by the intermediate computer electronic transaction history data of the on-line banking account, the electronic transaction history data including an abbreviation;
applying, by the rule processor, the set of rules to the abbreviation of the electronic transaction history data and a plurality of pre-determined normalized strings to determine respective edit distances representing respective degrees of transformation from the abbreviation of the electronic transaction history data to respective pre-determined normalized strings;
and selecting, by the rule processor, a normalized string from the plurality of pre-determined normalized strings that corresponds to the abbreviation of the electronic transaction history data based at least in part upon the determined respective edit distances for respective pairs of the abbreviation of the electronic transaction history data and respective normalized strings.

15. The method of claim 1, wherein application of the first rule to a pair of the abbreviation and a normalized string by the intermediate computer results in generation of a numerical result that is less than a numerical result generated by application of the Levenshtein distance to the same pair.

* * * * *